June 16, 1936.  V. F. ZAHODIAKIN  2,044,272
PISTON RING
Filed Nov. 24, 1933
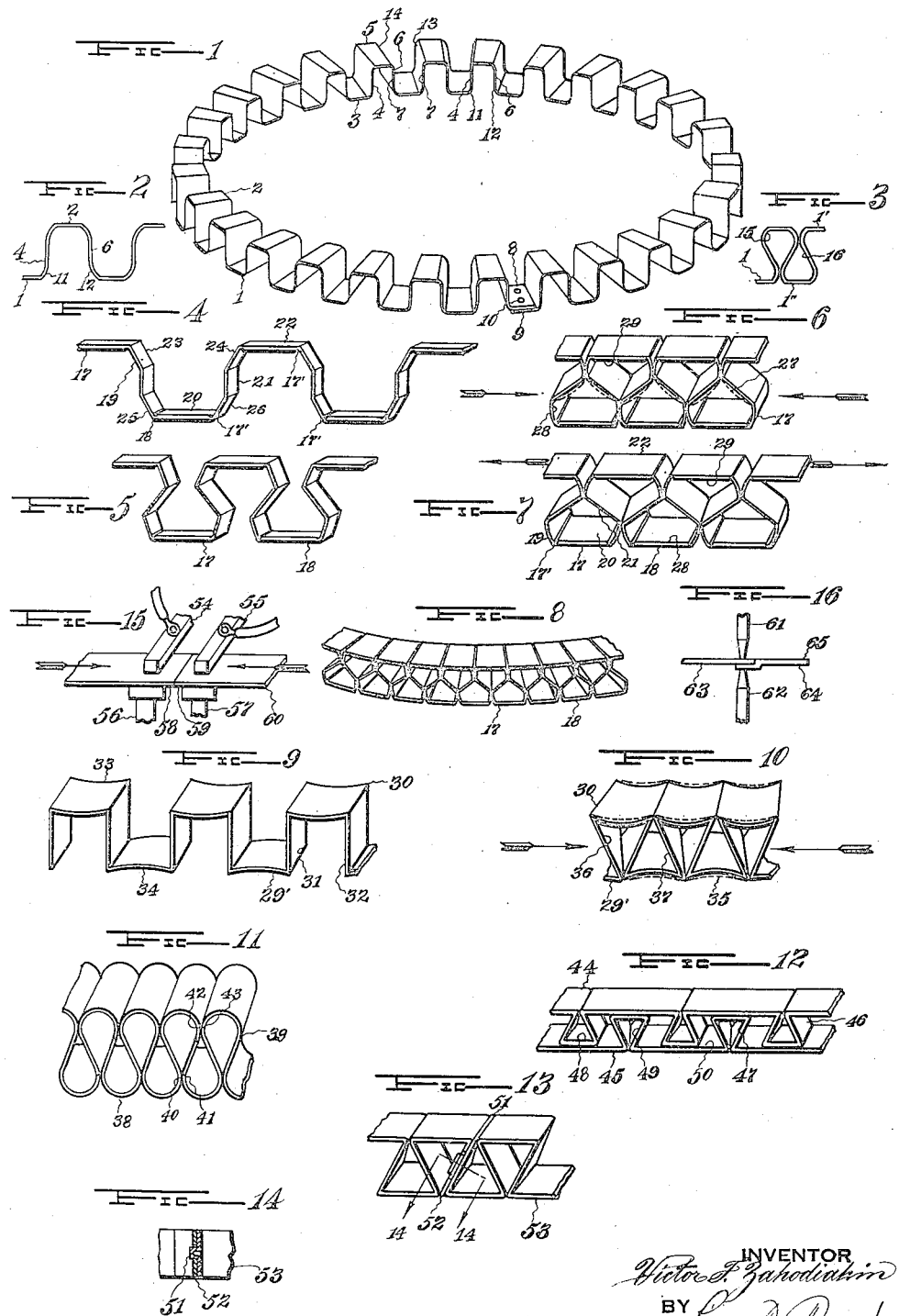
INVENTOR
Victor F. Zahodiakin
BY
ATTORNEY Patented June 16, 1936

2,044,272

UNITED STATES PATENT OFFICE 2,044,272

PISTON RING

Victor F. Zahodiakin, Cincinnati, Ohio, assignor to The Z-Flex Piston Ring Corporation, a corporation of New Jersey Application November 24, 1933, Serial No. 699,571

7 Claims. (Cl. 309—29)

The invention relates to improvements in piston rings particularly adapted for use in internal combustion engines, and the like.

Various manufacturers have been endeavoring to make an efficient piston ring which will expand outwardly and uniformly contact the cylinder walls, so that the fuel charge may be compressed in the cylinder without the oil in the cylinder passing between the piston and cylinder walls into the combustion chamber. In order to accomplish this result it is necessary that the rings positively seal the cylinder and this can be accomplished only by the ring expanding outwardly with uniform pressure in contact with the entire circumference of the cylinder walls.

Also, if the rings uniformly contact the cylinder walls, escape of oil into the combustion chamber is prevented, whereby carbon formation is eliminated on the piston, in the piston grooves, valve ports, valves, and in the oil regulating ring and other parts of the engine, such as in the oil return holes in the piston ring, whereby these holes will not become clogged with carbon and, therefore, will permit the ring to operate efficiently at all times.

Moreover, it is important to provide a piston ring constructed in such a manner that, irrespective of the period of time the ring has been used, it will continue to exert uniform outward pressure against the cylinder walls. And, with respect to the type ring described and claimed in my application for a patent filed October 30, 1933, which is a companion to this application, it is desirable that irrespective of the period the ring has been in use the oil passages in the ring will remain completely walled and without usual gaps or spaces usually provided to compensate for expansion and contraction.

Therefore, the general object of the invention is to provide a piston ring formed from relatively flat or sheet material having great flexibility and being relatively light weight, and constructed in such a manner that said ring will give unusually long wear and at all times exert outward uniform pressure in contact with the cylinder walls, and so that expansion of the ring, resulting from its wear in the cylinder, will not reduce or impair its efficiency.

Other objects of the invention are to provide a simple, efficient, practical and economical piston ring which is flexible in all directions and, therefore, adapted to exert uniform outward pressure against the cylinder walls irrespective of the period of its use, or whether or not the axis of the piston remains parallel with the cylinder walls; to provide a piston ring having zig-zag or corrugated construction which is flexible in all directions and constructed in such a manner that when it is manually compressed for the purpose of being inserted in the piston groove, the extremities of said corrugations contact each other thereby providing oil passage and further compression of said ring causes bending of the metal at predetermined points, thereby maintaining a tension which is exerted outwardly whereby the outer edge of said ring contacts the cylinder walls at all points, irrespective of the period of its use and permitting said extremities of said corrugations to remain in contact and maintain said completely walled passages; to provide a piston ring comprising a plurality of integrally formed sections each of which is adapted to exert pressure against the cylinder walls whereby, irrespective of the shape or contour of said walls said piston will seal the space between the piston and said walls; and to provide a piston ring so constructed that it may be quickly and economically formed from any desirable kind of flat or sheet material which has flexibility.

Other objects of the invention will be more fully apparent from the hereinafter description and the accompanying drawing.

The invention consists in the combination of the elements, arrangement of the parts and in the details of the construction, as hereinafter fully described and claimed.

In the drawing:

Fig. 1 is a perspective view of the invention;

Fig. 2 is a side elevational view of the invention, with parts broken away;

Fig. 3 is the same showing the invention fully compressed;

Fig. 4 is a perspective view of a modification of the invention, partly broken away, in extended form;

Fig. 5 is the same shown partly compressed;

Fig. 6 is the same shown fully compressed;

Fig. 7 is the same after having had considerable wear;

Fig. 8 is the same, fully compressed, and showing a greater number of corrugations;

Fig. 9 is a perspective view showing a modification of the invention, with parts broken away, in extended form;

Fig. 10 is the same fully compressed;

Fig. 11 is a perspective view of the invention, shown partly broken away, in fully compressed position;

Fig. 12 is a perspective view of a modified form of the invention, shown partly broken away, in fully compressed position;

Fig. 13 is a perspective view of the invention, shown partly broken away, in fully compressed position showing means for connecting its ends;

Fig. 14 is a section taken on a line corresponding to 14—14 in Fig. 13;

Fig. 15 is a perspective view of a butt welding apparatus, with parts broken away, showing a method of connecting the ends of the invention, shown with parts broken away; and Fig. 16 is a perspective view of a spot welding apparatus, with parts broken away, showing a method of connecting the ends of the invention, shown with parts broken away.

In the preferred construction of the invention I provide the piston ring 1 having zig-zag structure which has formed therein the corrugations 2 whose walls 3, 4, 5 and 6 extend transversely of the ring and are curved at their ends. When the ring is in extended position, as shown in Fig. 1, the walls 3 and 5 are horizontal and extend in near parallel relation with each other, and the walls 4 and 6 are vertical and extend in near parallel relation with each other. The walls 3, 4, 5 and 6 respectively, have equal width and length, whereby the spaces 7, between the walls 4 and 6, have equal area.

The piston ring 1 is formed from relatively flat or sheet material which may be of any kind suitable and desirable for the purpose of utilization to form an efficient and flexible piston ring. Since the material from which the ring is formed is flexible, tension of the material, when the ring is compressed, tends to exert radial and circumferential pressure. The ends 8 and 9 of the ring are overlapped and secured in fixed relation to each other as by the rivets 10, or any other suitable method of connecting, electric welding, male and female connections, and the like.

When it is intended to insert the ring 1 in a usual piston groove of a conventional piston, the ring is manually compressed which reduces its diameter, and its thickness. Further compression of the ring 1 causes the inner curved edges or extremities 11 and 12, of the walls 4 and 6, to be in close contact with each other and simultaneously the upper curved edge or extremity 13 of the wall 4 is in contact with the upper curved edge of the adjacent curved upper edge or extremity 14, whereby the spaces or oil passages 15 and 16, as shown in Fig. 3, are formed from walls 3, 4 and 6 and 4, 5 and 6 respectively, whereby excess oil which is on the cylinder walls is adapted to pass through the passages 15 and 16 and into usual oil perforations which are drilled in the piston and the oil is adapted to be returned to the crank case of the engine.

When compressed, the ring 1 has the upper and lower walls 1′ and 1″. The spaces 15 and 16 are so positioned that always a portion of each space 16 is directly below a portion of the space 15.

In order that the piston ring 1 shall be compressed sufficiently to be inserted in the groove of the usual piston, it is necessary that the ring be compressed a considerable degree after the lower curved edges 11 and 12, of the walls 4 and 6, contact each other and after the upper curved edges 13 and 14, of the walls 4 and 6, contact each other, whereby considerable tension is induced in the material from which the ring is formed with the result that although the piston ring becomes considerably worn, and thereby expands outwardly in contact with the cylinder walls, as the wearing process proceeds, yet the oil passages 15 and 16 remain completely walled, since the lower curved edges 11 and 12, of the walls 4 and 6, and the upper curved edges 13 and 14 of the walls 6 and 4, remain in contact with each other.

The piston ring 1 may be constructed economically from ordinary flat sheet flexible material as by running the same through a roller or pressing die machine for the purpose of forming therein the corrugations 2, after which the ends 8 and 9 of the ring may be overlapped and secured together in any suitable manner.

In Figs. 4 to 8 is shown a modification of the invention comprising the piston ring 17 having zig-zag structure and which has formed therein the corrugations 18 whose walls 19, 20, 21 and 22 extend transversely of the ring. The walls 19 and 21 are vertical, whereas the walls 18 and 22 are horizontal. The upper edges of the walls 19 and 21 are bent outwardly thereby forming the projections or extremities 23 and 24, whereas the lower edges of the walls 19 and 21 are bent inwardly thereby forming the projections or extremities 25 and 26.

When the ring is compressed a considerable degree, the adjacent projections 23 and 24 contact each other and the adjacent projections 25 and 26 contact each other. Further compression of the piston ring produces tension to the metal, since the metal automatically bends in the position represented by dotted lines 27 in Fig. 6, whereby when the piston ring has had considerable wear the tension naturally forces the ring outwardly in uniform contact with the cylinder walls and the wear automatically is compensated for by the metal in the ring assuming the position as shown in full lines in Fig. 7 which, however, results in the oil passages 28 and 29 remaining completely walled since the projections 23 and 24, of the walls 19 and 21, and the projections 25 and 26 remain in contact with each other.

Fig. 4 shows the invention in the form when it is fully expanded. Fig. 5 shows the invention partly compressed. As shown in Fig. 6, the ring is completely compressed and with tension in the metal which expands when heated in use in the conventional engine and the metal expands in the form represented by dotted lines 27. Fig. 7 shows the invention after it has been in use a considerable period of time and the outer edge thereof has worn sufficiently to permit the ring to expand, caused by tension of the metal, and yet the extremities or projections 23 and 24, and 25 and 26 remain in contact with each other, whereby the oil spaces 28 and 29 remain completely walled.

In Figs. 4, 5, 6, 7 and 8 are shown the grooves 17′ formed in the metal at desired positions for the purpose of permitting folding of the ring at predetermined points and in predetermined positions. The grooves 17′ enable the user to conveniently fold the ring in predetermined form.

In Figs. 9 and 10 is shown still another modification of the invention comprising the piston ring 29′ having formed therein the corrugations 30 comprising the substantially parallel vertical inwardly curved walls 31 and 32 and the inwardly curved horizontal walls 33 and 34. As shown in Fig. 10 when the ring 29′ is fully compressed the tension in the bent metal permits the walls to bend as represented by full lines and when the ring is considerably worn the walls 33 and 34 assume position represented by dotted lines 35, and maintain completely walled oil passages 36 and 37.

In Fig. 11 is shown another modification of the invention comprising the piston ring 38 having curved corrugations 39, whereby when the piston ring is compressed sufficiently to be inserted in the usual piston groove the lower curved edges or extremities 40 and 41 and the upper curved edges or extremities 42 and 43 contact each other and cause tension in the metal which exerts outward pressure and may expand a considerable distance outwardly without the curved edges 40, 41 and 42 and 43 respectively leaving contact with each other.

In Fig. 12 is shown still another modification of the invention which comprises the rings 44 and 45 having the corrugations 46 and 47, respectively, formed therein whereby when the ring is compressed the rings contact each other whereby a plurality of oil passages 48, 49 and 50 are formed.

In Figs. 13 and 14 is illustrated a method of securing together the ends 51 and 52 of the piston ring 53. The male end 51 is received in the female end 52 which securely retains the respective ends of the ring in fixed position with each other.

In Fig. 15 is shown the electrodes 54 and 55 spaced from the base plates 56 and 57 and having therebetween the ends 58 and 59 of the piston ring 60, whereby electrical current is adapted to automatically weld the respective ends 58 and 59 of the piston ring in secure position with each other.

In Fig. 16 is shown the electrodes 61 and 62 having therebetween the overlapping ends 63 and 64, of the ring 65, whereby when electric current passes through the electrodes the ends of the ring are welded together.

An important advantage of the invention is to provide a piston ring which may be quickly and economically manufactured and which is adapted to exert uniform outward pressure with respect to the cylinder walls, and which is provided with oil passages adapted to remain effective and efficient and completely walled irrespective of the period of time said ring has been used in the internal combustion engine.

Still another advantage is that the invention may be manufactured in a die press or roller press, whereby the cost of manufacture is considerably less than the cost of manufacturing the conventional piston ring presently being utilized in practically all internal combustion engines.

Still another advantage of the invention is that relatively large oil passages are provided through which the oil flows into the usual oil perforations in the piston, whereby oil is conserved and, also, the proper quantity of oil is maintained on the cylinder walls to provide efficient lubrication of the piston and cylinder walls, notwithstanding the fact that the outer edge of the ring may be considerably worn away by frictional contact with the cylinder walls.

Another advantage is that the piston ring is flexible and thereby automatically compensates for expansion, contraction and wear of the cylinder walls and the ring, or both, and this wear will not impair the original uniform pressure of the ring with respect to the cylinder walls, nor reduce the efficiency of the oil passages.

Still another advantage is that the piston ring is flexible and the metal is in tension when installed in an engine, and the possibility of breaking or cracking of the piston ring is entirely eliminated although continuous radial pressure is exerted by said ring.

Still another advantage of the invention is that the radial pressure of the ring is exerted by the plurality of corrugations or sections independently of each other on the entire circumference of the ring and at all points thereof and, since the ring readily conforms to the contour or shape of the cylinder walls, the space between the piston ring and the cylinder walls is permanently sealed irrespective of the shape of the cylinder, or the period of its usage. Also, by reason of the above mentioned structure, the ring is relatively light weight.

It is apparent that I have devised a novel and useful structure which embodies the features of advantages enumerated, and while I have, in the present instance, shown and described preferred embodiments thereof which will give in practice satisfactory and reliable results, it is to be understood that the same is susceptible of modification in various particulars. In other words, it is apparent that the parts of the invention may be of any size and constructed of any materials deemed convenient and suitable for an article of this character, and while I have illustrated and described a form of construction and arrangement of the elements found desirable in materializing the invention, I wish to emphasize the fact that I desire to include in this application all equivalents and substitutes that may fairly be considered to come within the scope and purview of the invention as defined in the claims.

What I claim as new and desire to secure by Letters Patent is:

1. A piston ring, as an article of manufacture, constituted of strip sheet material including loops forming a multiplicity of tubes opening at the peripheries of the ring in a plurality of rows in relatively different planes, and the tubes of one row staggered to the tubes of a second row.

2. A piston ring, as an article of manufacture, constituted of continuous strip material including a plurality of tubes opening at the peripheries of the ring in a plurality of superposed rows.

3. A piston ring formed of flexible strip material looped to form a multiplicity of tubes opening at the inner and outer sides of the ring, said tubes disposed in rows in different planes, the tubes of one row staggered with respect to the tubes of the other row, the walls of adjacent tubes lying in abutment and receding from said abutment whereby the ring is dilatable.

4. As an article of manufacture, a piston ring fabricated of a strip of sheet material and consisting of a series of return bend portions forming the walls of a plurality of overlapping oil conducting tubes, said tubes being closed throughout their length and opening at the inner and outer sides of the ring, the walls of adjacent tubes including inclined portions adjacently disposed and receding from abutment toward the top and bottom walls of the ring and forming clearances between the tubes for permitting free dilation of the ring.

5. A piston ring formed from corrugated strip material, the corrugations forming tubes in said ring opening at the inner and outer peripheries of the ring, adjacent walls of said tubes abutting and inclined away from each other to the top and bottom walls of the tubes respectively forming clearances which permit compression of the ring as installed placing the respective walls under spring tension tending to expand the ring.

6. A piston ring formed from strip material looped to form tubes in said ring opening at the inner and outer peripheries of the ring, said tubes being staggered with respect to each other and overlapping adjacent walls of said tubes abutting and inclined away from each other to the top and bottom walls of the tubes respectively forming clearances which permit compression of the ring as installed placing the respective walls under spring tension tending to expand the ring.

7. As an article of manufacture, a piston ring fabricated of strip material and consisting of successive loops forming a plurality of oil conducting tubes extended between the inner and outer peripheries of the ring, the walls of adjacent tubes including curved abutment portions and receding from abutment toward the top and bottom walls of the ring for forming clearances between the tubes for permitting free dilation of the ring.

VICTOR F. ZAHODIAKIN.